United States Patent [19]
Young

[11] Patent Number: 5,877,762
[45] Date of Patent: Mar. 2, 1999

[54] SYSTEM AND METHOD FOR CAPTURING IMAGES OF SCREENS WHICH DISPLAY MULTIPLE WINDOWS

[75] Inventor: James A. Young, San Jose, Calif.

[73] Assignee: Apple Computer, Inc., Cupertino, Calif.

[21] Appl. No.: 925,270

[22] Filed: Sep. 8, 1997

Related U.S. Application Data

[63] Continuation of Ser. No. 394,488, Feb. 27, 1995, abandoned.

[51] Int. Cl.⁶ .................................................. G06F 3/14
[52] U.S. Cl. .......................... 345/344; 345/340; 345/118
[58] Field of Search ..................................... 345/340, 342, 345/343, 344, 345, 356, 434, 118

[56] References Cited

U.S. PATENT DOCUMENTS

| | | | |
|---|---|---|---|
| 4,710,767 | 12/1987 | Sciacero et al. | 345/119 X |
| 4,769,636 | 9/1988 | Iwami et al. | 345/120 |
| 4,769,762 | 9/1988 | Tsujido | 395/157 |
| 4,779,081 | 10/1988 | Nakayama et al. | 345/120 |
| 4,783,648 | 11/1988 | Homma et al. | 345/120 |
| 4,806,919 | 2/1989 | Nakayama et al. | 345/120 |
| 4,890,257 | 12/1989 | Anthias et al. | 395/157 |
| 4,982,345 | 1/1991 | Callahan et al. | 345/434 |
| 5,265,202 | 11/1993 | Krueger et al. | 395/345 |
| 5,276,437 | 1/1994 | Horvath et al. | 345/119 |
| 5,515,494 | 5/1996 | Lentz | 395/157 |
| 5,522,025 | 5/1996 | Rosenstein | 395/158 |
| 5,561,755 | 10/1996 | Bradley | 395/157 |

OTHER PUBLICATIONS

Lemke, David et al, "Visualizing X11 Clients", *The X Resource 2*, Spring 1992, pp. 131–153.

Primary Examiner—Matthew M. Kim
Assistant Examiner—Crescelle N. dela Torre
Attorney, Agent, or Firm—Burns, Doane, Swecker & Mathis, L.L.P.

[57] ABSTRACT

Methods and apparatus for capturing images on screens which display multiple windows. Exemplary embodiments eliminate unnecessary reading and writing of information pertaining to display data that is not visible. A user designates an arbitrary region of a screen to be captured, which can cross windows that are displayed at different layers within the image. A snapshot of the selected region is obtained by retrieving data for each of the pixels in the region, converting them into standard values, and storing them in an off-screen pixel map. Before the data for the pixels is obtained, a listing is made of all windows that are encompassed by the designated region. For each window a record is made of the portion of the window that is visible within the designated region. If no portion is visible, the window is removed from the list. After all of the windows within the region have been examined in this manner, only the pixels pertaining to the recorded visible portion of each window need to be read and stored in the pixel map. With this approach, redundancy is eliminated, since only the visible pixel data is retrieved and written to the pixel map.

20 Claims, 8 Drawing Sheets

SYSTEM AND METHOD FOR CAPTURING IMAGES OF SCREENS WHICH DISPLAY MULTIPLE WINDOWS

This application is a continuation of application No. 08/394,488, filed Feb. 27,1995, now abandoned.

FIELD OF THE INVENTION

The present invention is directed to a system for capturing and storing information displayed on the screen of a computer monitor or the like, and more particularly to a system for capturing images in which multiple windows are displayed in an overlapping fashion.

BACKGROUND OF THE INVENTION

In computer systems, it is sometimes desirable to capture a portion of an image displayed on the screen of the computer's monitor. For example, the user may desire to print the captured portion of the image, or save it in a file to be electronically mailed to another person and/or subsequently processed, e.g. edited in a graphics application.

To capture a screen image, the user first designates the portion of the image to be captured, by defining a rectangular or other arbitrarily-shaped region on the screen. A screen capture routine then proceeds to obtain a data value for each display pixel within the defined region, and stores it off-screen in a suitable data structure, such as a bit map. Depending upon various factors, including the application program that generated the displayed data and various hardware specifications, the information contained within the pixel values can vary. For example, some applications may define display colors in terms of their red, green and blue components, so-called RGB values. Other applications may define colors in terms of other parameters, such as luminance and chrominence, for example. To create the off-screen pixel map, the various kinds of information are converted into a standard format. Typically, the display data is converted into an RGB format, and stored in the bit map so that each pixel is characterized by its red, green and blue components.

The data that is obtained by the screen capture routine is generated by currently active application programs that are writing data to the screen. If only one application program is active, and all of its data is presented in a single layer and/or single format, the screen capture process is quite straightforward. Basically, only one set of information needs to be accessed to determine the image that is being displayed in the designated region.

With many modern computer systems that employ a graphical user interface, however, the image data is not always displayed in a single layer. Rather, it can be displayed in multiple layers, typically in the form of windows. For example, the user interface might display a root layer which presents the metaphor of a desktop. Data displayed by one application program typically appears in a window on the desktop. For example, a word processing program might display a document within a window. If a second document is opened by the user, it is displayed in a separate window. Similarly, if the user activates a second application program, such as a communications program, its interface is displayed to the user in yet another window. The various windows can overlap one another, to present the appearance of having a stacking order where they are located at different effective distances from the viewer. Depending upon their sizes and relative locations, one window can completely obscure other windows that are below it in the stacking order, so that the lower windows are not visible to the user.

When the displayed information consists of multiple layers, for example in the form of overlapping windows, the screen capture process becomes more involved. More particularly, to gather all information regarding the displayed image, the screen capture routine must access the displayed data from each of the open windows in the designated region of the screen. Thus, in the example given above, the screen capture process obtains data from the user interface which provides the desktop metaphor, each of the two windows for the word processing documents, and the communications program interface.

In the past, a "painter's algorithm" has been employed to capture the screen display data. In essence, the algorithm iterates over each pixel of each window within the designated region of the screen, regardless of whether that pixel in the window is visible or obscured. The RGB information for the pixel is obtained, and stored in an off-screen pixel map. The algorithm proceeds recursively from the lowest layer, such as the desktop, to the topmost descendent of that layer. If four windows overlap a given screen pixel, for example, that pixel is read four times, and "painted" four times into the off-screen pixel map, i.e. once per window.

It can be appreciated that the use of the painter's algorithm to capture screen data is quite inefficient when windows overlap and obscure one another, and results in unnecessary duplication of computer system resources. It is desirable, therefore, to provide a screen capture system which eliminates unnecessary multiple reading and writing of data for display layers which are obscured by other information. In particular, it is desirable to provide a screen capture process which can quickly and efficiently eliminate data relating to obscured windows, and thereby eliminate a number of the redundant reading and writing operations inherent to screen capture processes such as those that use the painter's algorithm.

SUMMARY OF THE INVENTION

In accordance with the present invention, a screen capture system is provided which eliminates unnecessary reading and writing of information pertaining to display data that is not visible to the user. In operation, the user designates an arbitrary region of a screen to be captured. This region can cross multiple windows that are displayed at different layers in the stacking order and may have different data formats. A snapshot of the selected region is obtained by retrieving data for each of the pixels in the region, converting them into standard values, and storing them in an off-screen pixel map.

Before the data for the pixels is obtained, a listing is first made of all display layers, e.g. windows, that are at least partially contained in the designated region. Each of the windows on the list is then examined, beginning with the window in the foreground portion of the display. As each window is examined, a record is made of the portion of the window that is visible within the designated region. If no portion is visible, the window is removed from the list, so that data pertaining thereto is not subsequently read or written to the pixel map.

After all of the windows within the region have been examined in this manner, only the pixels pertaining to the recorded visible portion of each window need to be read and stored in the pixel map. With this approach, redundancy is eliminated, since only the pixel data for visible windows is retrieved and written to the pixel map. Pixel data that is obscured by a higher level window is not processed, thereby resulting in a more efficient system.

These and other features of the present invention, as well as the advantages offered thereby, are explained in greater detail hereinafter with reference to a particular embodiment illustrated in the accompanying drawings.

DETAILED DESCRIPTION

The present invention is directed to a system for capturing images displayed on a computer monitor, or the like. To facilitate an understanding of the principles which underlie the present invention, it is described hereinafter with reference to specific embodiments illustrated in the accompanying drawings. It will be appreciated, however, that the practical applications of the invention are not limited to these particular embodiments. For example, windows are typically employed in many graphical user interfaces to function as containers which delineate items of information that are displayed at different effective viewing distances, and therefore provide a good example for illustrating the principles of the present invention. The invention is not limited to windowing systems, however. Rather, it has general applicability to any type of display interface in which different units of displayed information can be over-laid upon one another, thereby obscuring some of the information from view.

Figure 1:
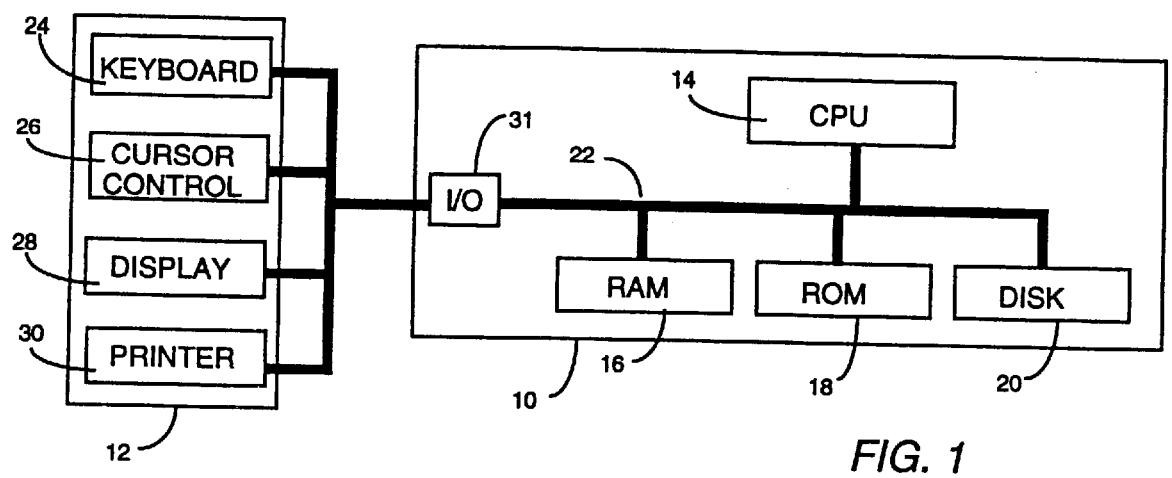
FIG. 1 is a block diagram of a typical computer system.

The particular hardware components of a computer system on which the present invention is implemented do not form a part of the invention itself. However, they are briefly described herein, to provide a thorough understanding of the manner in which the features of the invention cooperate with the components of a computer system to produce the desired results. Referring to FIG. 1, a typical computer system, such as a personal computer or a workstation, includes a computer 10 having a variety of external peripheral devices 12 connected thereto. The computer 10 includes a central processing unit 14 and associated memory. This memory generally includes a main memory which is typically implemented in the form of a random access memory 16, a static memory that can comprise a read-only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such as a CRT monitor or an LCD panel, provides a visual display of the information that is being processed within the computer, for example the contents of a document or a computer-generated image. A hard copy of this information, or a selected portion thereof, can be provided through a printer 30, or similar such device. Each of these external peripheral devices communicates with the CPU 14 by means of one or more input/output ports 31 on the computer.

Figure 2A:
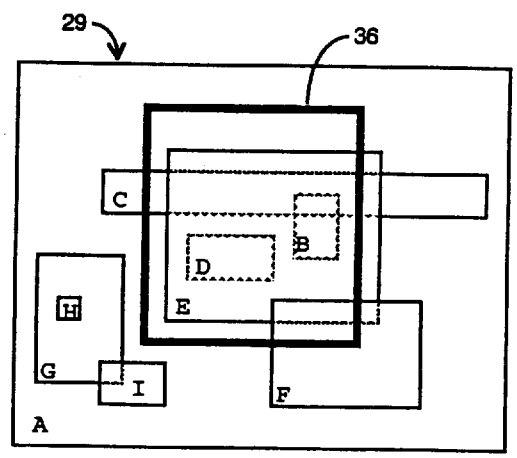
FIG. 2A is an example of a screen display containing multiple windows.

FIG. 2A is an illustration of the type of information that might typically appear on the screen 29 of the display device 28. The particular example of FIG. 2A pertains to a graphical user interface that provides a desktop metaphor. Typically, in this type of user interface, the image of the desktop will occupy the entire area of the screen. In the example of FIG. 2A, the desktop is displayed within the area A on the screen. Each of the application programs running on the computer displays data within one or more associated windows. Various examples of these windows are represented in FIG. 2A with the reference characters B-I. Technically speaking, in some graphical user interfaces, the desktop itself might not be considered to be a window, in the sense that it may not possess all of the attributes typically associated with a window. However, for purposes of this description, the desktop A is referred to as a window, namely the root window from which all other windows descend. In the context of the present invention, therefore, the term "window" refers to any layer, container or other such portion of a screen image which displays information to the computer user.

The sequence of the reference characters A–I in FIG. 2A indicates that order in which the windows were drawn, or displayed, on the desktop A, and thereby reflects their relative stacking order. Thus, the window A, i.e. the desktop, is at the deepest level, followed in order by the windows B, C, D and E, with the window F being in the foreground. As can be seen, the windows are located at various positions on the desktop. Furthermore, the windows can overlap one another, such that the information contained in windows in the background is partially or totally obscured by other windows in the foreground. For example, portions of the windows B, C, E and G are obscured by the windows C, E, F and I, respectively. The windows B and D are totally obscured by the window E.

Figure 2B:
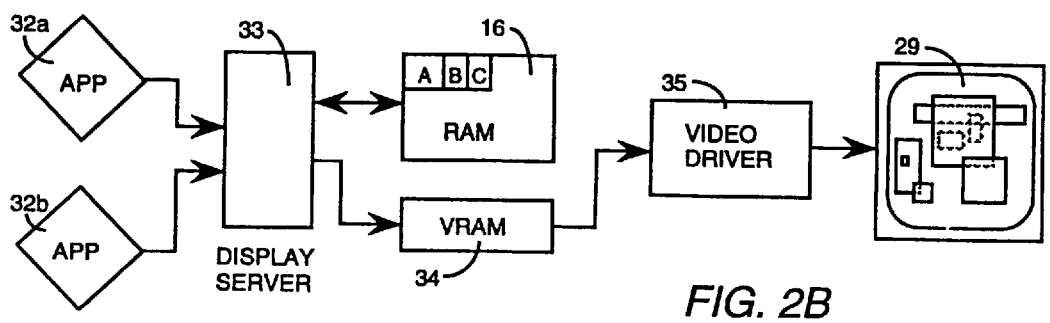
FIG. 2B is a more detailed block diagram of the components of the computer system which participate in displaying information on the screen.

The manner in which information generated by applications programs is displayed on the screen 29 is illustrated in FIG. 2B. Referring thereto, when an application program 32a or 32b generates information to be displayed, that information is provided to a display server 33. Typically, the display server is a component of the operating system software that is running on the computer. It may include a window manager or windowing system which controls the size and position of windows to be displayed on the screen. The display server also stores the information that is to be displayed in each window on the computer screen 29. For example, the display server might store the contents of the desktop A in one portion of the memory 16, the contents of the window B in another portion of the memory 16, and so on. The information for the respective windows B and C might be associated with different application programs 32a and 32b, for example. As the user changes the stacking order of windows, for example by clicking the cursor control device 26 while the cursor is positioned on a lower window to bring that window to the foreground of the display, the contents of the window are retrieved from the memory 16 and displayed in the window.

Since the various windows can overlap one another, not all of the information contained in each window is displayed. The information which is actually displayed is stored in a video RAM (VRAM) 34. This VRAM could be a designated portion of the main RAM 16, but is more preferably a separate memory device. The information is stored in the VRAM 34 in the form of a bit map containing pixel values, such as RGB values. These pixel values are provided to a display driver 35 which causes the information to be displayed on the screen 29.

The user may desire to capture a portion of the image displayed on the screen, for example to print it or to save it for later processing. A routine for capturing some or all of the screen image can reside in the memory 16 of the computer as a separate application program, or it can be part of the computer's operating system, e.g. a utility or part of a toolkit. When the capture function is called, the user is prompted to designate a region to be captured. Typically, the user might designate such a region by drawing a rectangle or other arbitrarily shaped region on the screen, for example by using the cursor control device 26. In FIG. 2A, this designated region is shown by the bold rectangle 36. Once this region has been designated, the screen capture routine obtains data pertaining to each display pixel within the designated area, and stores it in an off-screen pixel map in the memory 16 or 20 of the computer.

Figure 3:
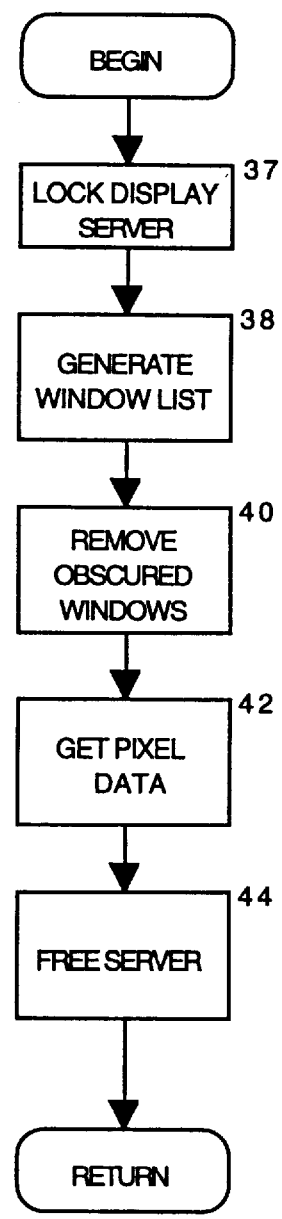
FIG. 3 is a flowchart of the general process of the present invention.

The process for obtaining the pixel data in accordance with the present invention is explained with reference to the flowcharts shown in the figures. FIG. 3 provides a general overview of the process, and subsequent flowcharts provide details of certain steps within the general process. Referring to FIG. 3, when the screen capture routine is called, the first step that is carried out is to lock the display server 33 (Step 37). During the time the screen capture process is being carried out, it is important that the image on the screen not be altered. By locking the display server, all requests by application programs to display data are held in a queue in the memory 16. As such, the displayed windows and their contents cannot be moved or modified in any manner. As part of the process of locking the server, a portion of the computer's memory 16 can be allocated to hold the image that is to be retrieved.

Figure 4:
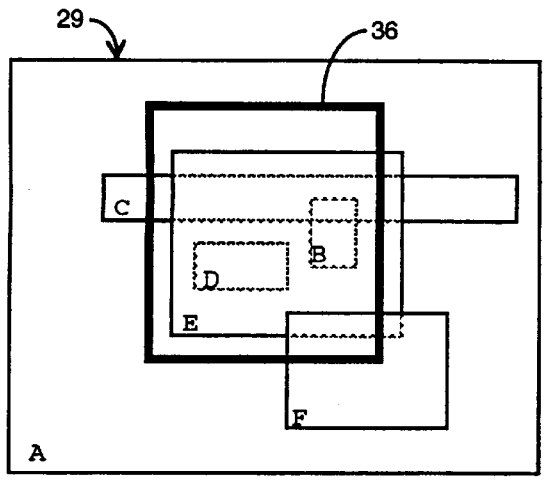
FIG. 4 is another example of the screen display, showing the results of generating a window list.

The next step in the process is to generate a list of windows which intersect the selected region 36. Referring to the example of FIG. 2A, it can be seen that the desktop A, as well as the windows B–F, are at least partially contained within the selected region 36. In contrast, the windows G, H, and I lie totally outside of the selected region 36. Consequently, during Step 38, a list is generated which identifies only those windows that are contained within the selected region 36. For the example of FIG. 2A, the list would contain the desktop A, and the windows B–F, but would not include the windows G–I. FIG. 4 illustrates the effective result that is obtained after the window list is generated.

Figure 5:
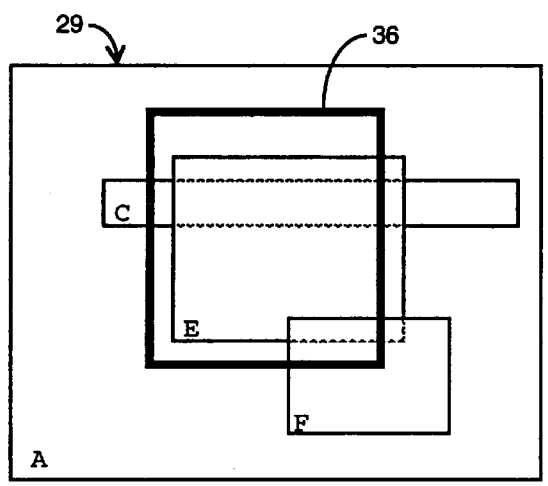
FIG. 5 is a further example of the screen display, showing the results of removing obscured windows.

After the window list has been generated in Step 38, it is examined to remove obscured windows therefrom (Step 40). Any window which is totally obscured by one or more other windows can be safely removed from the list, since no portion of it is visible within the selected region 36. In the example of FIG. 2A, windows B and D are removed from the list, since they are totally obscured. The result which is obtained after this step is illustrated in FIG. 5. As can be seen, the list now contains only the desktop, or root window A, and the windows C, E, and F. The result of Step 40, therefore, is a list of windows which are at least partially visible within the selected region 36.

At Step 42, each window in this list is examined, to obtain pixel data for those pixels contained within the selected region 36. The windows are examined in the order in which they appear on the list, beginning with the lowest window. Thus, each pixel in the root window A which is visible within the selected region 36 is accessed to obtain its display data. This display data is converted into RGB color information, and stored at a corresponding location in the off-screen pixel map. This procedure is repeated for each window on the list, to complete the map.

Once the pixel information from all of the visible windows has been obtained, the display server is freed at Step 44, and the pixel map data is forwarded to the program which requested it, where it can be stored for later processing and/or printed.

Figure 6:
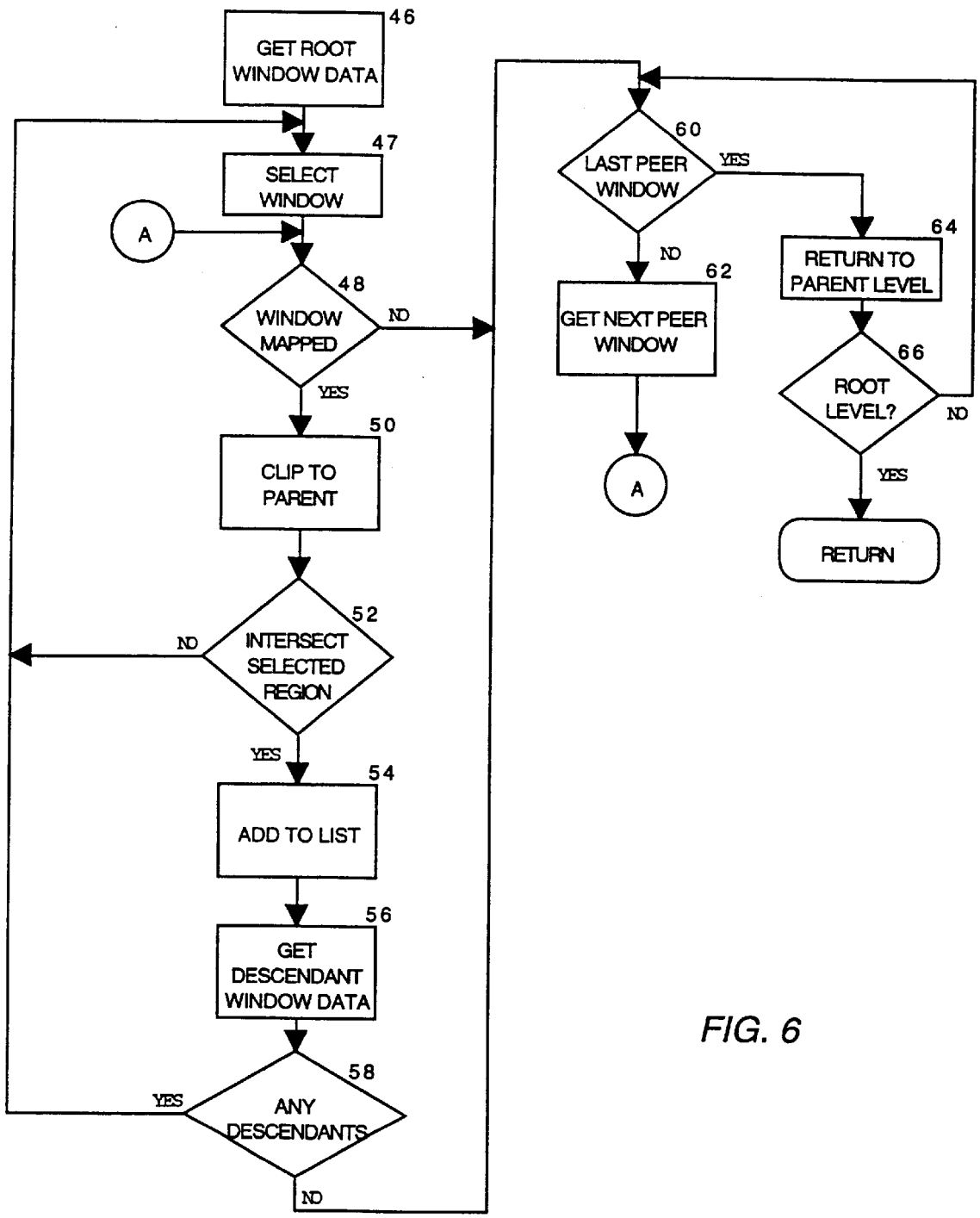
FIG. 6 is a flowchart of the subroutine for generating the window list.

The subroutine for generating the window list, Step 38, is illustrated in detail in FIG. 6. Referring thereto, this subroutine is entered by making a call to obtain data pertaining to the root window (Step 46). Typically, the root window contains the entirety of the image that is displayed on the monitor. In the example of FIG. 2A, the root window comprises the desktop. In other user interfaces which do not employ a desktop metaphor, the root window is the base layer of displayed information from which all other layers descend. In operation, Step 46 results in a call to the display server 33 with a request for information regarding the current window of interest, i.e. the root window. In a computer running the Unix X Window system, for example, this call can take the form of the XGetWindowAttributes command. In response, the display server returns a list of all windows that descend from the current window, together with such other information as their coordinates, data format, bit depth (i.e. number of displayable colors), and the like.

At Step 47, one of the windows on the returned list is selected. For each window in the returned list, it is first examined at Step 48 to confirm that it is currently mapped to the screen, i.e. that it is being stored in the RAM 16 for display. For example, some operating systems permit users to selectively hide currently active windows from view. If a window is hidden by the user, it is not mapped for display. If it is not mapped, it is ignored, since any descendants of this window likewise cannot be visible. If the window is mapped, its coordinates are clipped to those of its parent window in Step 50. More particularly, the displayed portion of any window cannot lie outside of its parent window. Referring to FIG. 2, if the user should move window F down and to the right, so that only its upper left quadrant is contained within the desktop A, the other three quadrants which lie outside of the desktop would not be displayed to the user. In other words, they are clipped from view. Therefore, Step 50 ensures that only relevant pixel data is considered in the capture process.

At Step 52, the coordinates of the window are examined to determine whether they lie within the selected region 36. If not, the window is ignored. When a window is not within the selected region, none of its descendants can be in the selected region because they are clipped to it. Therefore, the descendants do not need to be considered in the selection process either. The process returns to Step 47, where the next window on the list from the display server is selected. If, on the other hand, at least a portion of the window lies within the selection rectangle, it is added to the window list at Step 54.

This procedure is recursively carried out, descending through the window hierarchy. At Steps 56 and 58, a determination is made whether the current window which was added to the list has any descendent windows. This is carried out by means of a similar call to the display server, such as the XGetWindowAttributes command in the X Windows system. If the response to this call indicates that the current window has descendents, one of these windows is selected at Step 47, and the process repeated. Once the lowest level of the hierarchy has been reached, any peer windows of the current window at that level of the hierarchy are identified and selected in Steps 60 and 62, and processed in a similar manner.

Figure 7:
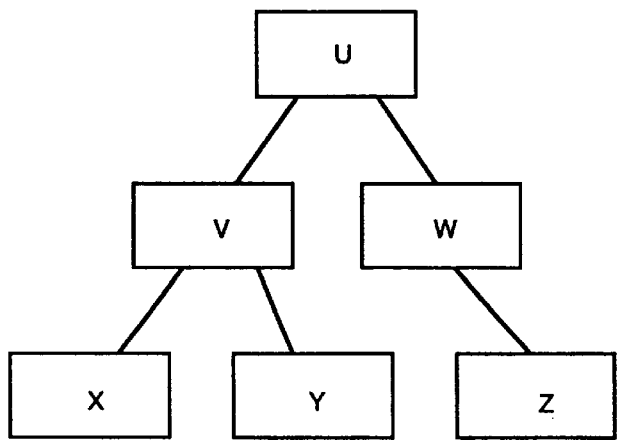
FIG. 7 is a diagram of an exemplary window hierarchy.

FIG. 7 illustrates one example of a possible hierarchy for displayed windows. In this example, window U is the root window, and windows V and W descend directly from it. Windows X and Y descend from window V, and window Z descends from window W. At Step 46 of the process depicted in FIG. 6, the root window data would include an identification of windows V and W. At Step 47, window V is selected, and processed to determine whether it falls within the selected region. Assuming it does, at Step 56 the descendent window data for window V is called, which returns an identification of windows X and Y. At Step 47, therefore, window X is selected and processed to determine whether it falls within the selected region. Since window X has no descendants, a negative response will be obtained at Step 58. In this case, the process proceeds to Steps 60 and 62, in which case window Y is selected as the next peer of window X.

Once window Y has been examined, the process proceeds to Step 64, since window Y has no children and no unexamined peers. At this point, the process returns to the parent level, i.e. the level of window V. A determination is made at Step 66 to see if the process has returned to the root level. In this case it has not, and so a determination is made at Step 60 whether there are any unexamined peer windows at this level. Since window W has not yet been examined, it is selected in Step 62, and the process returns to Step 48. After windows W and Z have been examined for inclusion within the selection rectangle, the process returns to the root level at Step 64. At this point, all windows which descend from the root window, either directly or indirectly, have been examined. Therefore, the subroutine ends, and the list generated in Step 54 includes all windows which are at least partially contained within the selected region 36.

Figure 8:
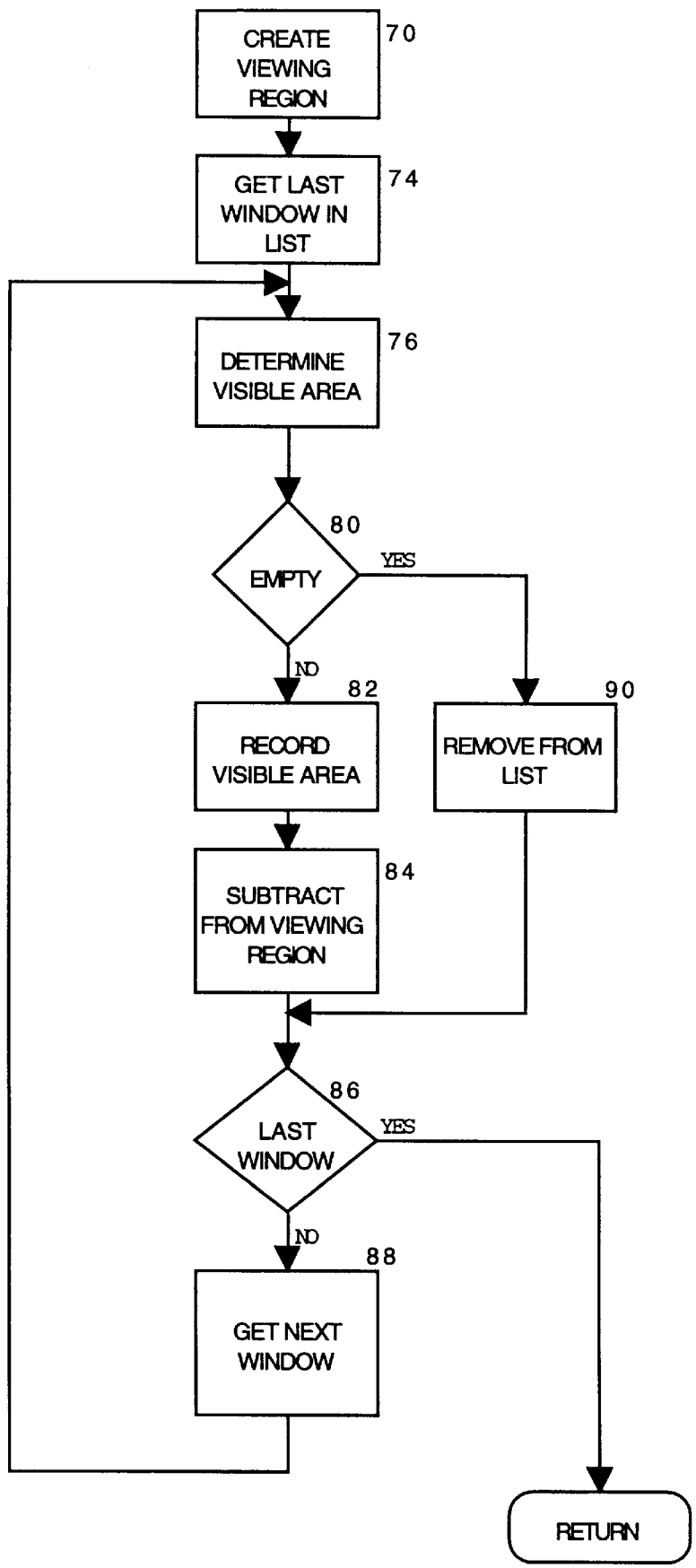
FIG. 8 is a flowchart of the subroutine for removing obscured windows.
Figure 9A:
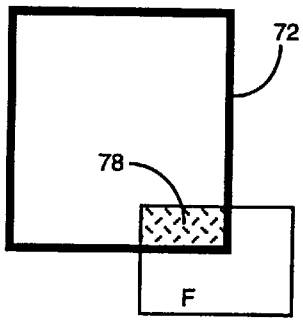
FIGS. 9a–9k are illustrations of an example of the steps carried out in the process depicted in FIG. 8.

FIG. 8 is a more detailed flowchart of the process that is carried out at Step 40 in the flowchart of FIG. 3, to remove the obscured windows from the list that is generated at Step 54. Referring to FIG. 8, at Step 70 a viewing region is created. The viewing region represents the area of the selected region 36 for which pixel information has not yet been obtained. Therefore, at the beginning of the subroutine, the viewing region has dimensions that are equal to those of the selected region 36. The viewing region 72 is illustrated in FIG. 9*a*.

Once the viewing region has been created, the visible portion of each window in the window list is determined by calculating the intersection of its area with that of the viewing region. This determination begins with the last window in the list, i.e. the foremost window in terms of stacking order. Referring to FIG. 8, the top window is selected at Step 74, and its visible area is determined at Step 76 by taking the intersection of this window's area with the viewing region. In the Example of FIGS. 2A, 4 and 5, the top window is window F. Therefore, this window is selected at Step 74. Referring to FIG. 9*a*, the intersection of window F with the viewing region 72 is depicted by the shaded area 78.

Figure 9B:
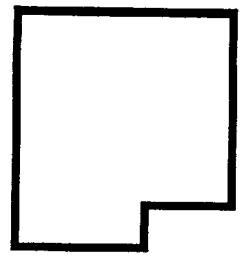

At Step 80, a determination is made whether the intersection of the selected window and the selection region is empty. For window F, the intersection is not empty, meaning that the window is at least partially visible. At Step 82, therefore, the visible area 78 is stored in a window record. At Step 84, the visible area of the window F is subtracted from the viewing region, resulting in a new viewing region as shown in FIG. 9*b*.

Figure 9C:
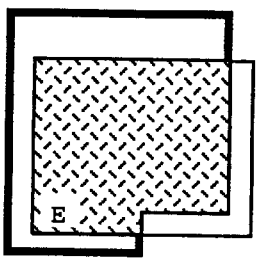
Figure 9D:
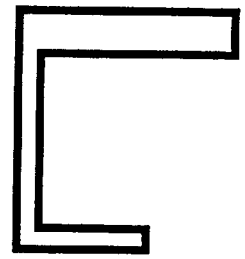

At Step 86, a check is made to determine whether the current window is the last window in the list. In the present example, window F is not the last window, and so the next window on the list, window E, is selected at Step 88. This procedure is repeated for each window in the list. The results that are obtained after each iteration are depicted in FIGS. 9*c*–9*k*. The shaded portion of FIG. 9*c* illustrates the visible area of window E, and FIG. 9*d* illustrates the resulting viewing region 72 after this visible area has been subtracted (Step 84).

Figure 9E:
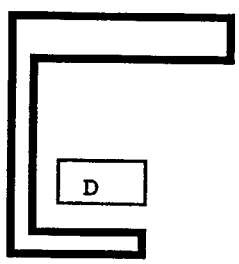
Figure 9F:
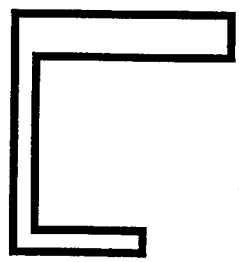

During the next iteration in which window D is the selected window, the intersection of the window and the viewing region is empty, as shown in FIG. 9*e*. Since the intersection is empty, the window is fully obscured. Therefore, the window is removed from the window list at Step 90. In this case, the viewing region remains the same, as shown in FIG. 9*f*.

Figure 9G:
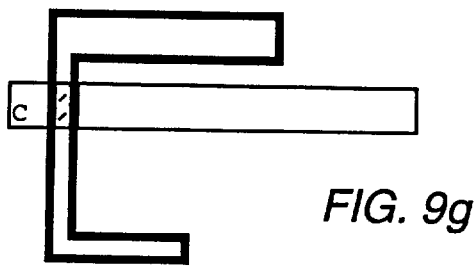
Figure 9H:
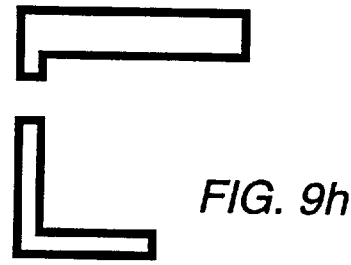
Figure 9I:
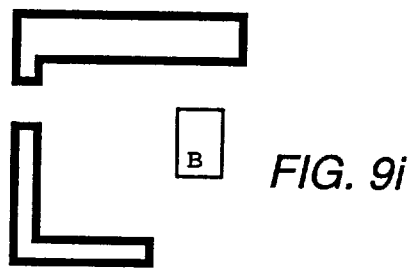
Figure 9J:
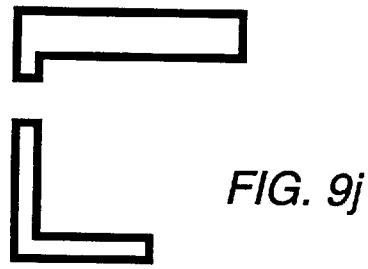
Figure 9K:
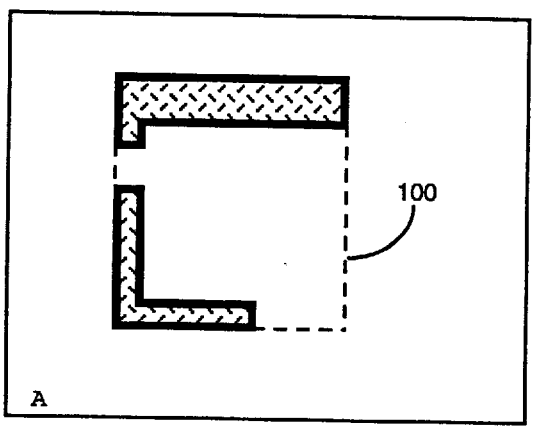

FIG. 9*g* illustrates the intersection of the window C and the selection region, and FIG. 9*h* illustrates the remaining portion of the viewing region after the visible area of window C has been subtracted from it. In FIG. 9*i*, the intersection of window B and the viewing region is again empty, and so window B is subtracted from the window list at Step 90. As shown in FIG. 9*j*, the selection region remains the same.

In the final iteration, the intersection of root window A with the viewing region is then calculated, to determine the visible portion of window A. This intersection region is subtracted from the viewing region, which results in the viewing region now being empty. Since the root window A is the last window on the list, the result at Step 86 causes the process to return the information regarding the visible region of each window, as recorded at Step 82. Alternatively, the process can return as soon as a determination is made that the viewing region is empty. In this case, any remaining unexamined windows on the list, i.e. those with a lower stacking order, are removed since they are not visible. The net result of this subroutine in the example of FIG. 2A is that two more windows, namely windows B and D, have been removed from consideration. The resulting window list contains only those windows which are at least partially visible within the selected region 36.

Figure 10:
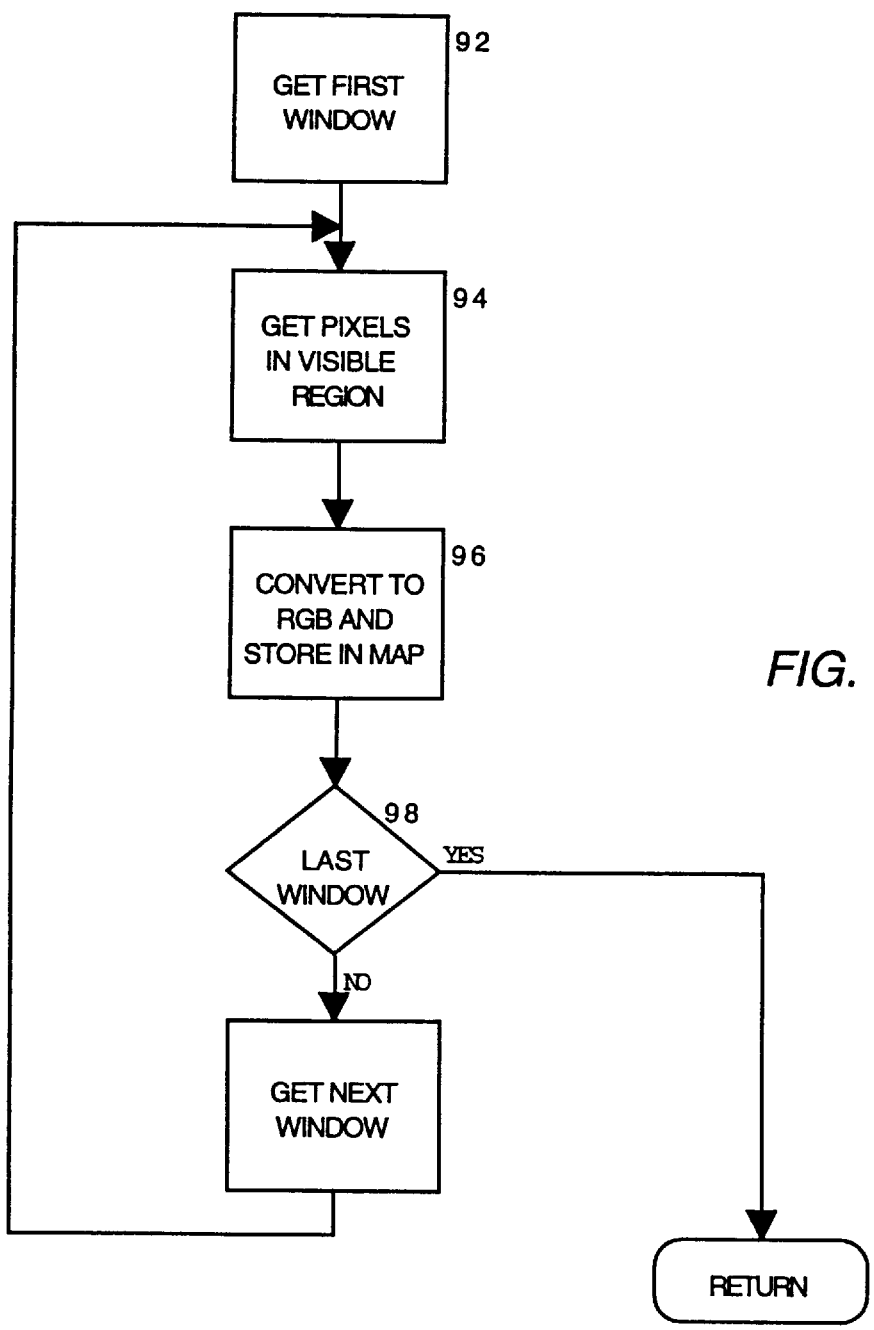
FIG. 10 is a flowchart of the subroutine for obtaining pixel data.

FIG. 10 is a more detailed flowchart of Step 42 in FIG. 3, in which the pixel information for the visible windows is stored in an off-screen pixel map. At Step 92, the first window on the window list is selected. This window is the bottom, or deepest, window in the visible image. In the example of FIG. 2A, the root window A is selected first. At Step 94, the pixel information for the visible portion of this window is retrieved from the display server 33. In particular, the information that is returned in response to the call made at Step 94 comprises a display value for each pixel within the viewing region for that window. In the preferred embodiment of the invention, RGB data is stored in the pixel map. Therefore, at Step 96, the color information obtained from the pixel values is converted into RGB data, and stored in the memory map. This process is repeated for each window on the list, and after the last, i.e. top, window, the data in the pixel map is returned to the program that called the subroutine, at Step 98.

Depending upon the particular windowing system that is employed in the computer, the information retrieved at Step 94 may comprise more than just the visible pixels in the window. For example, the X Window Server that is utilized with the Unix operating system responds to a call XGetImage to retrieve pixel data. This routine returns pixel values contained within a given rectangular area. As a result, display values for pixels which are obscured from view may be obtained and stored in the map. For example, referring to FIG. 9k, the visible portion of the root window A does not comprise a rectangular area. Therefore, in the X Window System, the returned pixel data might comprise all of the pixels within the dashed rectangle 100 shown in FIG. 9k, even though some of these pixels are obscured, if a single XGetImage command is employed to retrieve all of the pixel data for one layer. In this case, as the pixel data for subsequent, higher level windows is obtained, it overwrites the data for the obscured pixels.

Alternatively, it may be desirable to define the visible portion of the window in terms of a number of component rectangles, and issue a separate call for each rectangle. The choice as to which approach to employ, i.e. overwrite pixel data or determine component rectangles, will be dictated by the most efficient use of system resources.

From the foregoing, it can be seen that the present invention provides a screen capture routine in which windows that are totally obscured in the selected region are eliminated from consideration, thereby providing a more efficient approach to capturing portions of a display screen into an off-screen pixel map. It will be appreciated by those of ordinary skill in the art that the present invention can be embodied in other specific forms without departing from the spirit or essential characteristics thereof. The presently disclosed embodiment is considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for capturing data pertaining to an image displayed on a computer monitor, in which information is displayed in multiple windows that are located at different effective distances from the viewer in the image, comprising the steps of:

designating a boundary within the image, said boundary defining a capture region for which image data is to be stored for subsequent processing;

generating a list of each window that is at least partially contained within said capture region;

determining whether any window on said list is completely obscured from view within said capture region by other windows, and removing each such completely obscured window from said list;

obtaining pixel values for the windows which remain on said list; and storing said pixel values in a map, wherein said determining and removing steps include the steps of creating a viewing region which initially corresponds to the designated boundary and iteratively updating the viewing region by selecting successive windows in the list and, for each selected window, subtracting from the viewing region an area of intersection between the selected window and the viewing region. wherein windows in the list are selected in order of effective distance from shortest effective distance to longest effective distance.

2. The method of claim 1 wherein the display of the image on the computer monitor is controlled by a display server, and further including the steps of locking the display server at the beginning of said method to prevent the image from being changed while data is being captured, and unlocking said server at the completion of data capture.

3. The method of claim 2 wherein said pixel values are obtained from said display server, and further including the step of converting said pixel values into a standardized format for storage in said map.

4. The method of claim 1 wherein said list generating step includes the steps of:

identifying a hierarchy of windows displayed on the computer monitor;

selecting windows in said hierarchy and, for each selected window, determining whether that window intersects the capture region; and adding to the list each selected window which intersects the capture region, and determining whether the window has any descendant windows which also intersect the capture region.

5. The method of claim 4 further including the steps of:

clipping the area of each selected window to lie within the area of any window from which the selected window descends; and disregarding descendant windows of any selected window which does not intersect the capture region.

6. A method according to claim 1, wherein a computer user manually designates said boundary.

7. The method of claim 1 wherein said determining and removing step includes the steps of:

a) creating a viewing region corresponding to said capture region;

b) selecting a window from said list;

c) calculating the area of intersection between said viewing region and the selected window;

d) removing the window from the list if the area of intersection is null;

e) updating the viewing region by subtracting the area of intersection from the viewing region; and f) repeating steps b-e for each of the other windows on the list, wherein windows are selected in order of effective distance from shortest effective distance to longest effective distance.

8. The method of claim 7 including the further step of recording the area of intersection for each window that remains on the list, and wherein said step of obtaining pixel values comprises obtaining pixel values for the recorded area of intersection for each window that remains on the list.

9. A method for capturing data pertaining to an image displayed on a computer monitor, in which information is displayed in multiple windows that are located at different effective distances from the viewer in the image, comprising the steps of:

defining a capture region within the image;

generating a list of each window that is at least partially contained within said capture region;

determining whether any window on said list is completely obscured from view within said capture region by other windows, and removing each such completely obscured window from said list;

obtaining pixel values for the windows which remain on said list; and storing said pixel values in a map, wherein said determining and removing step includes the steps of:

a) creating a viewing region which initially corresponds to said capture region;
b) selecting a window from said list;
c) calculating the area of intersection between said viewing region and the selected window;
d) removing the window from the list if the area of intersection is null;
e) updating the viewing region by subtracting the area of intersection from the viewing region; and
f) repeating steps b–e for each of the other windows on the list, wherein windows are selected in order of effective distance from shortest effective distance to longest effective distance.

10. The method of claim 9 including the further step of recording the area of intersection for each window that remains on the list, and wherein said step of obtaining pixel values comprises obtaining pixel values for the recorded area of intersection for each window that remains on the list.

11. A system for capturing a portion of an image displayed on a computer monitor, comprising:
a display server which receives information, and displays said information on the computer monitor as an image having the appearance of different effective layers which can overlap one another;
means for designating a boundary within said image, said boundary defining a capture region for which image data is to be stored for subsequent processing;
means for generating a list containing each layer having an area that is at least partially contained within said capture region;
means for removing from said list each layer whose information is completely obscured within said capture region by displayed information in another layer; and
means for obtaining from said display server data values pertaining to the displayed information in each layer remaining on said list and storing said values in a map, wherein said means for removing includes
means for creating a viewing region which initially corresponds to the designated boundary and
means for iteratively updating the viewing region by selecting successive windows in the list and, for each selected window, subtracting from the viewing region an area of intersection between the selected window and the viewing region, wherein windows in the list are selected in order of effective distance from shortest effective distance to longest effective distance.

12. The system of claim 11 wherein each display layer comprises a window which contains displayed information.

13. A system according to claim 11, wherein said means for designating a boundary enables a computer user to manually designate said boundary.

14. The system of claim 11 wherein said removing means includes:
means for storing a viewing region which initially corresponds to said capture region;
means for successively calculating the intersection of the area of the layers on said list with said viewing region, and removing a layer from the list if there is no intersecting area; and
means for updating the viewing region by subtracting the intersecting area from the stored viewing region as the intersecting area for each layer is calculated.

15. The system of claim 14 wherein said calculating means stores the intersecting area of each layer, and said obtaining means obtains data values pertaining to the information displayed within the stored intersecting areas.

16. The system of claim 11 further including means for converting data values obtained from said display server into standardized values before storage in said map.

17. A system for capturing a portion of an image displayed on a computer monitor, comprising:
a display server which receives information, and displays said information on the computer monitor as an image having the appearance of different effective layers which can overlap one another;
means for defining a capture region within said image;
means for generating a list containing each layer having an area that is at least partially contained within said capture region;
means for removing from said list each layer whose information is completely obscured within said capture region by displayed information in another layer; and
means for obtaining from said display server data values pertaining to the displayed information in each layer remaining on said list and storing said values in a map, wherein said removing means includes:
means for storing a viewing region which initially corresponds to said capture region;
means for successively calculating the intersection of the area of the layers on said list with said viewing region, and removing a layer from the list if there is no intersecting area; and
means for updating the viewing region by subtracting the intersecting area from the stored viewing region as the intersecting area for each layer is calculated.

18. The system of claim 17 wherein said calculating means stores the intersecting area of each layer, and said obtaining means obtains data values pertaining to the information displayed within the stored intersecting areas.

19. A method for capturing data pertaining to an image displayed on a computer monitor, in which information is displayed in multiple windows that are located at different effective distances from the viewer in the image, comprising the steps of:
designating a boundary within the image, said boundary defining a capture region for which image data is to be stored for subsequent processing;
generating a list of each window that is at least partially contained within said capture region;
determining whether any window on said list is completely obscured from view within said capture region by other windows, and removing each such completely obscured window from said list;
recording an intersecting area for each window that remains on the list, wherein an intersecting area for a particular window corresponds to a portion of the particular window which is visible within said capture region;
obtaining pixel values for the recorded intersecting area for each window that remains on the list; and
storing said pixel values in a map, wherein said determining and removing steps include the steps of
creating a viewing region which initially corresponds to the designated boundary and
iteratively updating the viewing region by selecting successive windows in the list and, for each selected window, subtracting from the viewing region an area of intersection between the selected window and the viewing region, wherein windows in the list are selected in order of effective distance from shortest effective distance to longest effective distance.

20. A system for capturing a portion of an image displayed on a computer monitor, comprising:

a display server receiving information and displaying the information on the computer monitor as an image having the appearance of different effective layers which can overlap one another;

means for designating a boundary within the image, said boundary defining a region for which image data is to be stored for subsequent processing;

means for generating a list containing each layer having an area that is at least partially contained within said capture region;

means for removing from said list each layer whose information is completely obscured within said capture region by displayed information in another layer;

means for recording an intersecting area for each layer that remains on the list, wherein an intersecting area for a particular layer corresponds to a portion of the particular layer which is visible within said capture region; and means for obtaining from said display server data values corresponding to the intersecting area of each layer remaining on said list and storing said values in a map, wherein said means for removing includes means for creating a viewing region which initially corresponds to the designated boundary and means for iteratively updating the viewing region by selecting successive windows in the list and, for each selected window, subtracting from the viewing region an area of intersection between the selected window and the viewing region, wherein windows in the list are selected in order of effective distance from shortest effective distance to longest effective distance.

* * * * *